L. M. FRENCH & W. M. O'BRIEN.
AUTOMATIC PLAYING PIANO.
APPLICATION FILED NOV. 11, 1907.
931,192.
Patented Aug. 17, 1909.
8 SHEETS—SHEET 3.
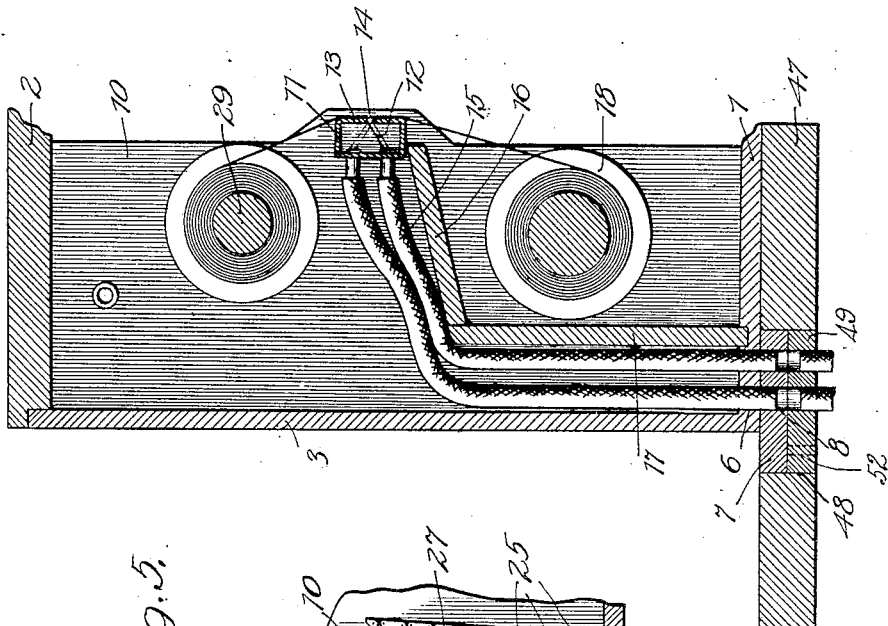
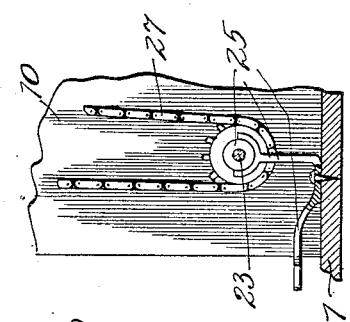
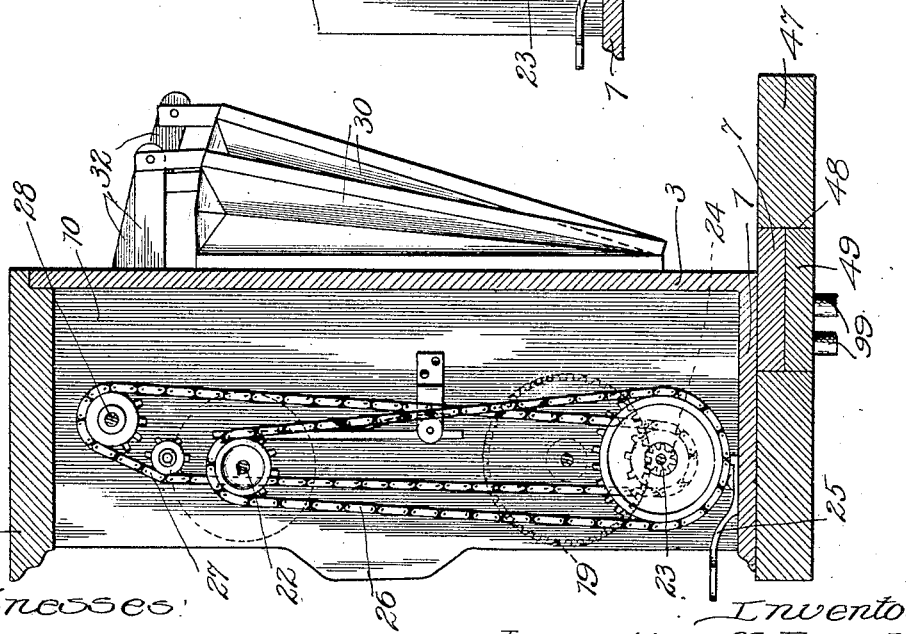
Witnesses
Harry R. L. White
Ray White
Inventors
Lamartine M. French
William M. O'Brien
By Brown & Williams
Attys.

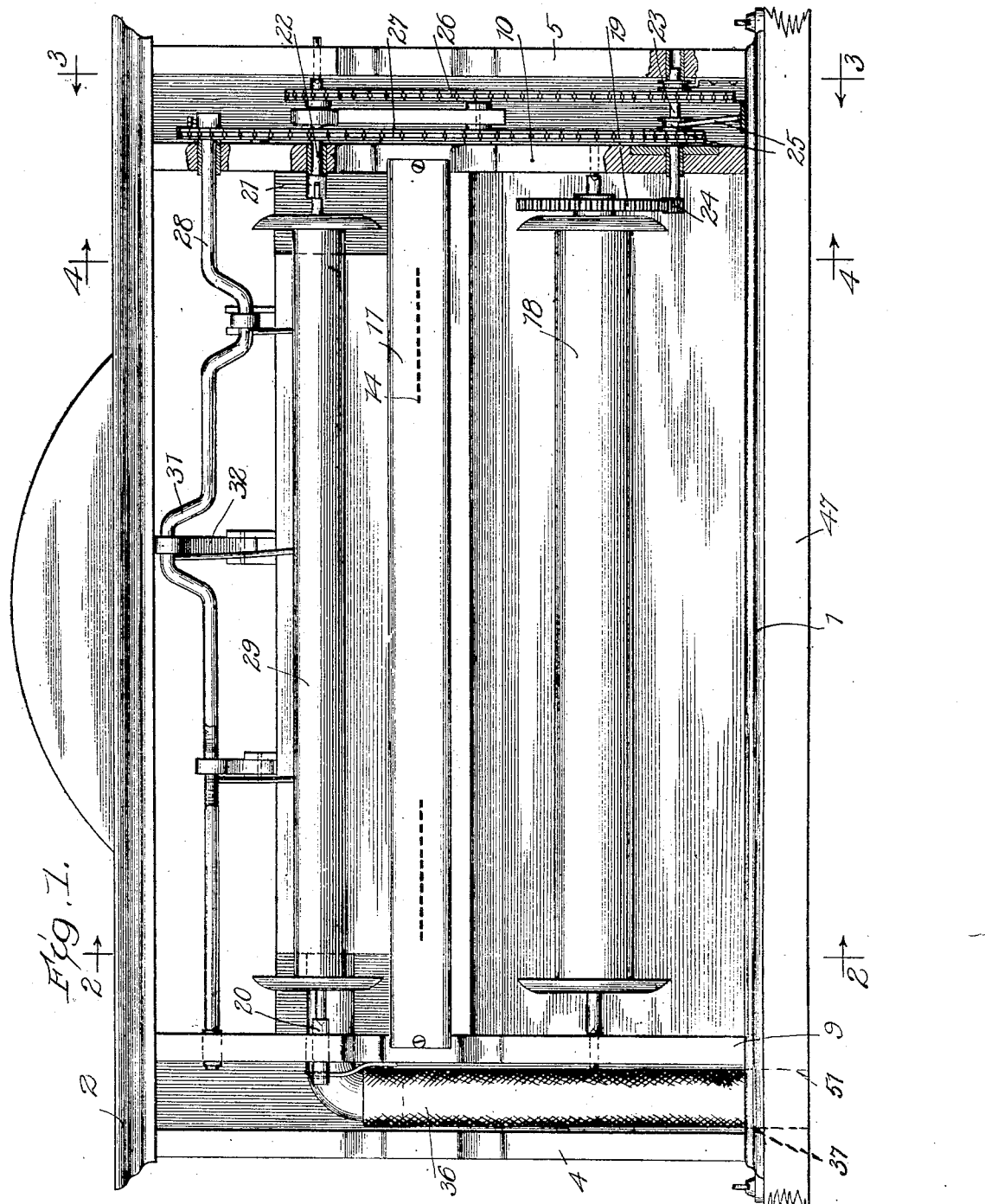

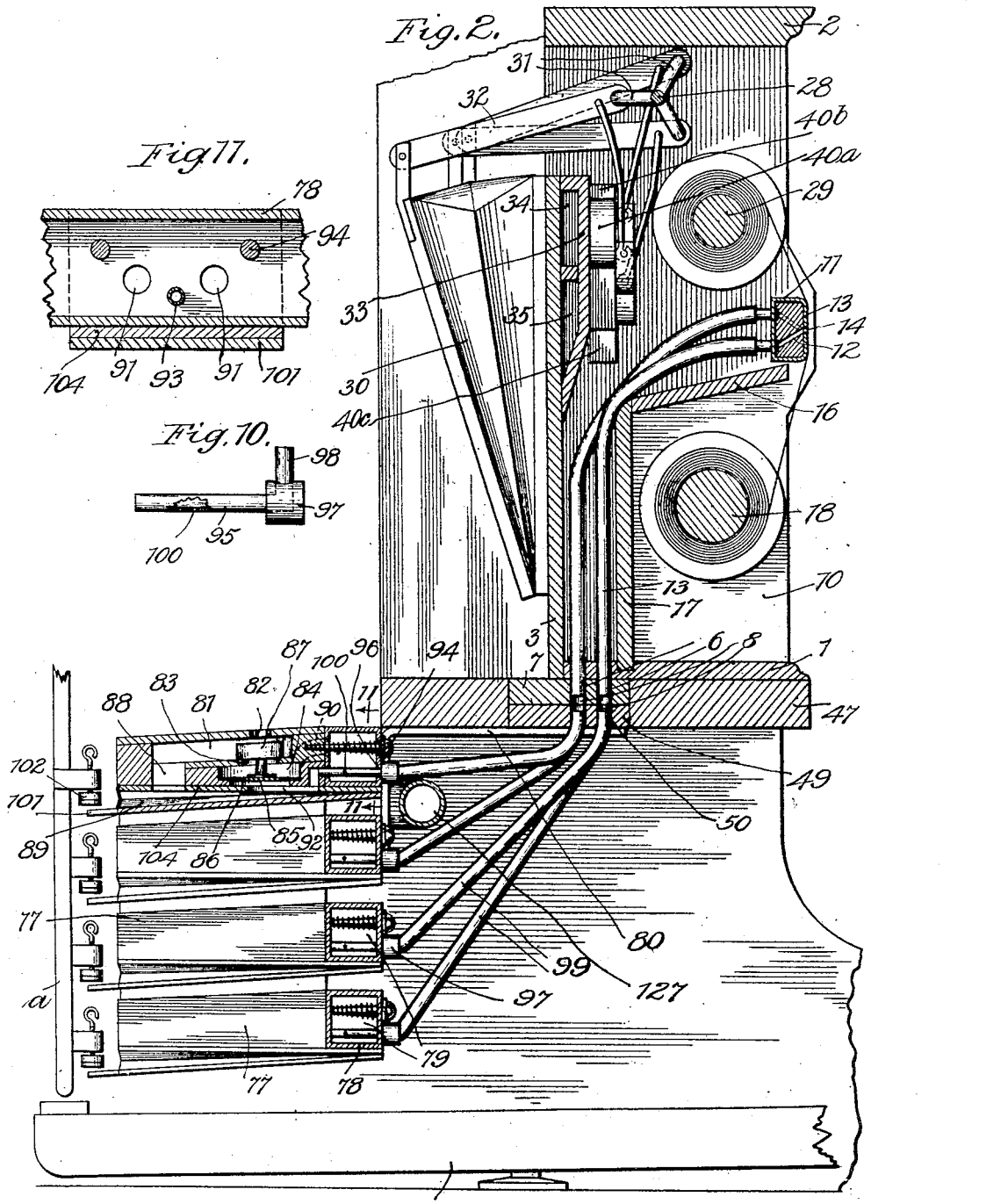

L. M. FRENCH & W. M. O'BRIEN.
AUTOMATIC PLAYING PIANO.
APPLICATION FILED NOV. 11, 1907.
931,192.
Patented Aug. 17, 1909.
8 SHEETS—SHEET 4.
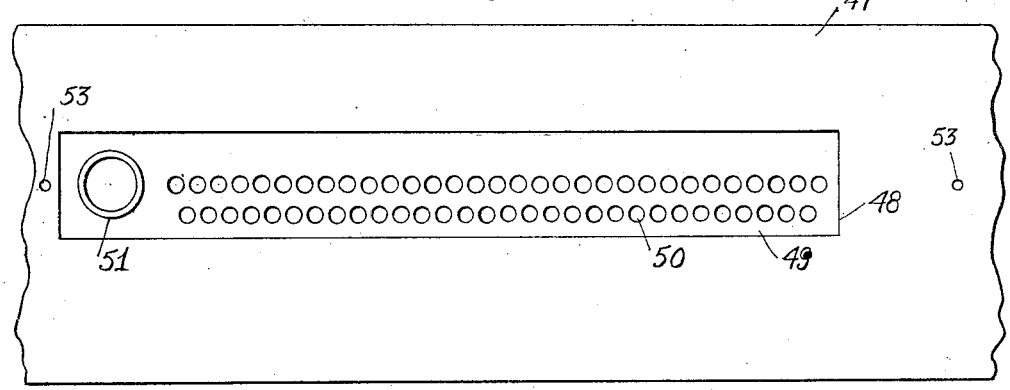
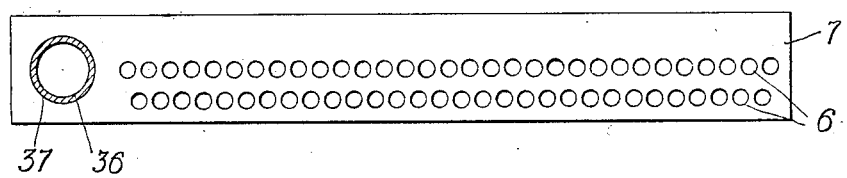
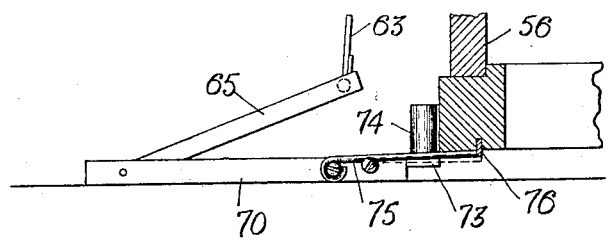
Witnesses:
George S. Higham.
Frank J. Thelen.
Inventors
Lamartine M. French
William M. O'Brien
By Brown & Williams
Attorneys

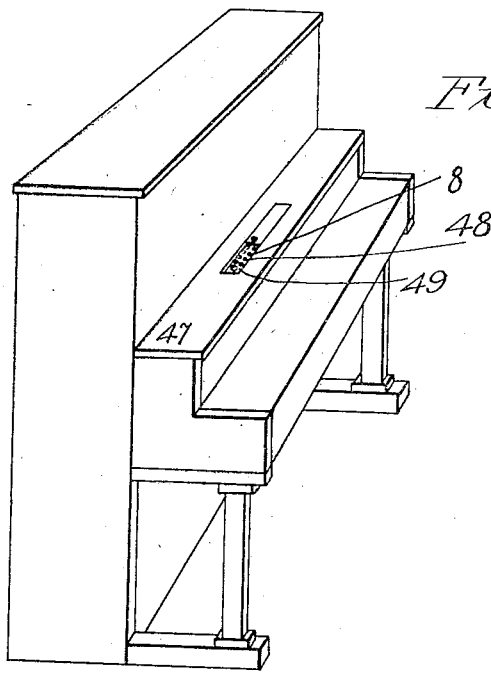
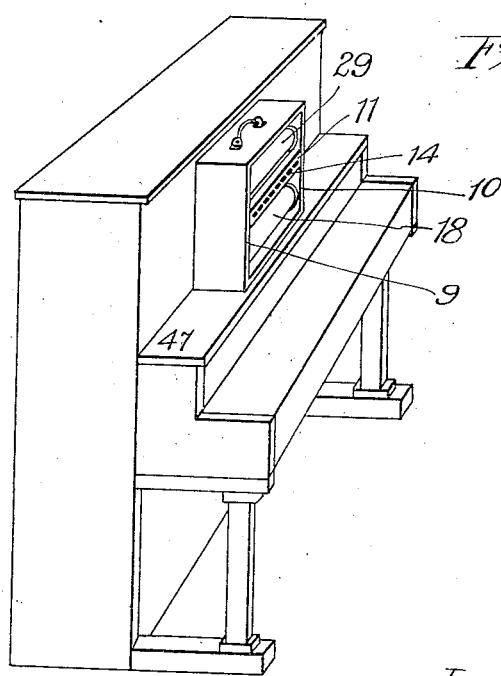

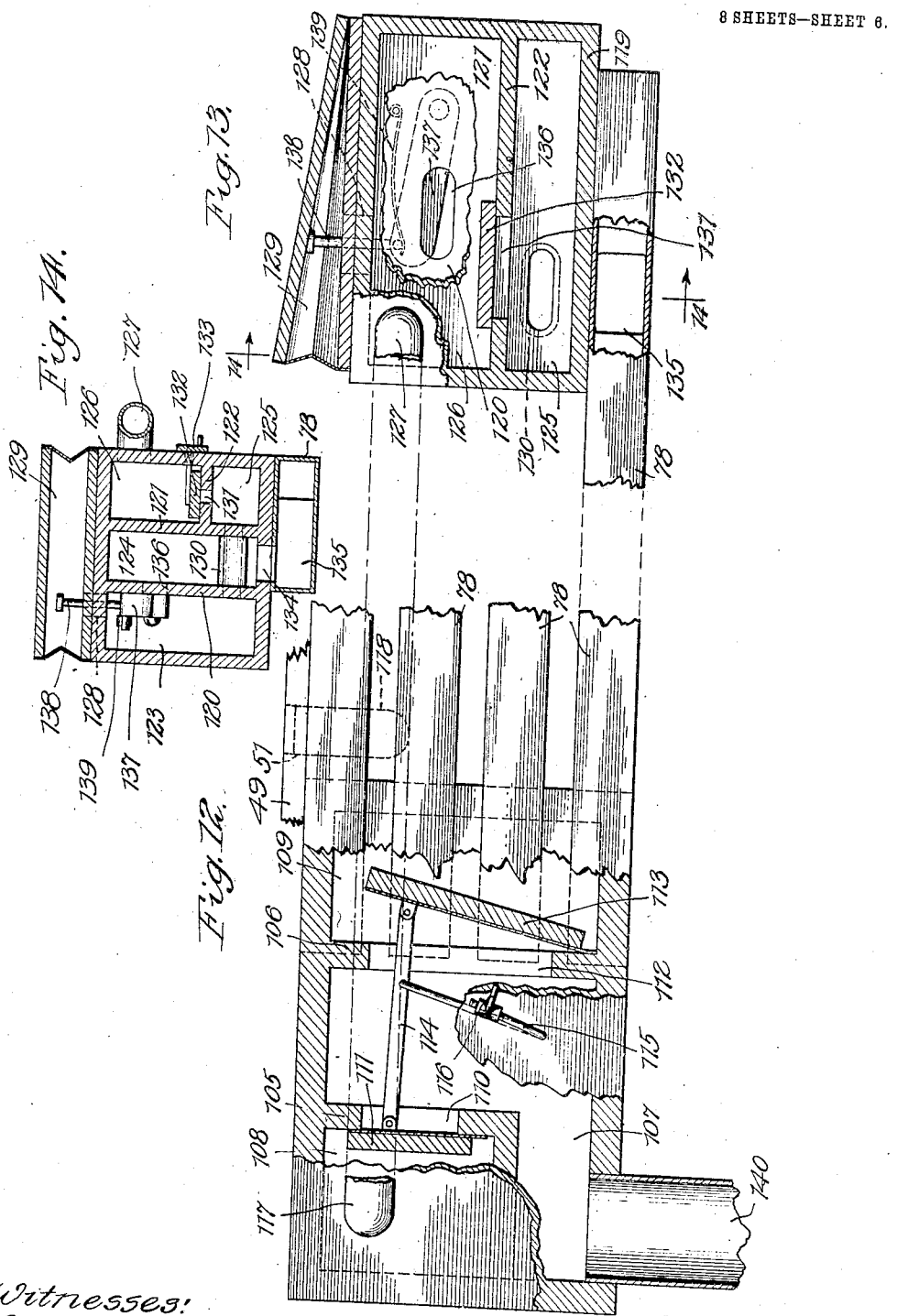

L. M. FRENCH & W. M. O'BRIEN.
AUTOMATIC PLAYING PIANO.
APPLICATION FILED NOV. 11, 1907.
931,192.
Patented Aug. 17, 1909.
8 SHEETS—SHEET 7.
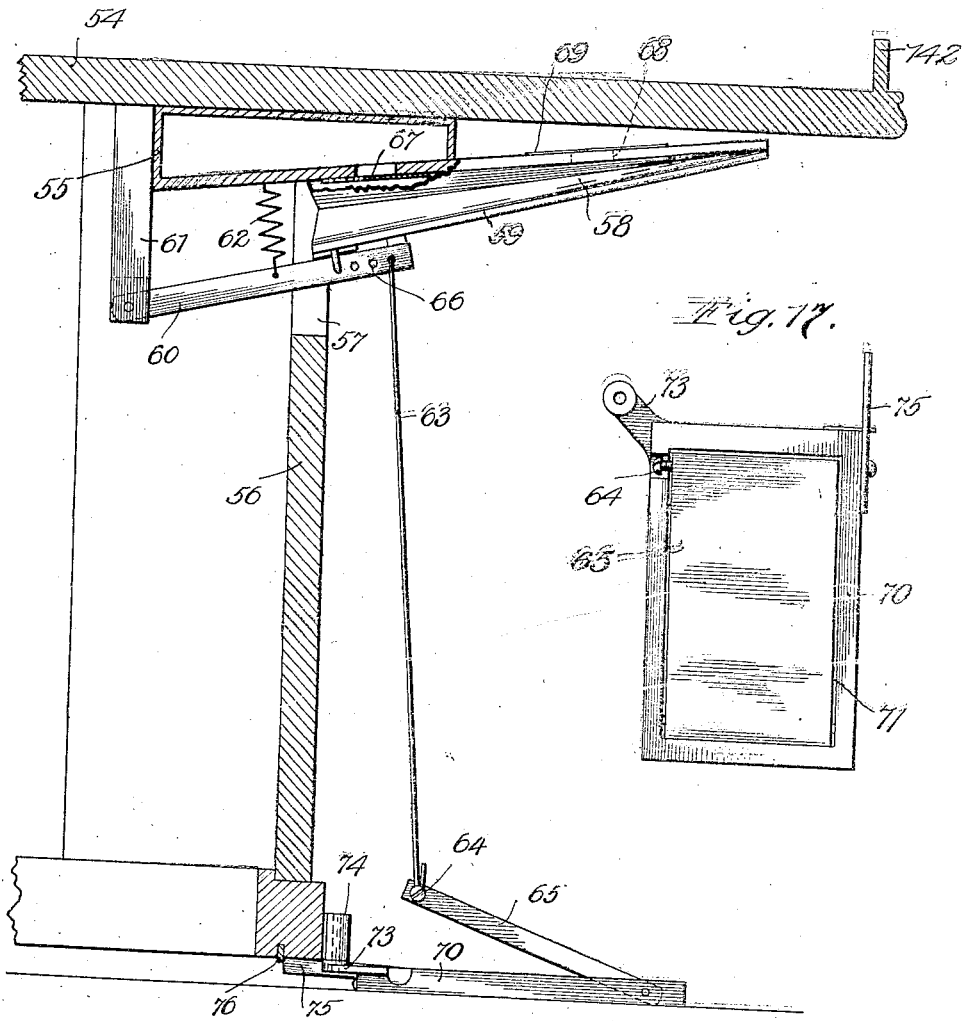
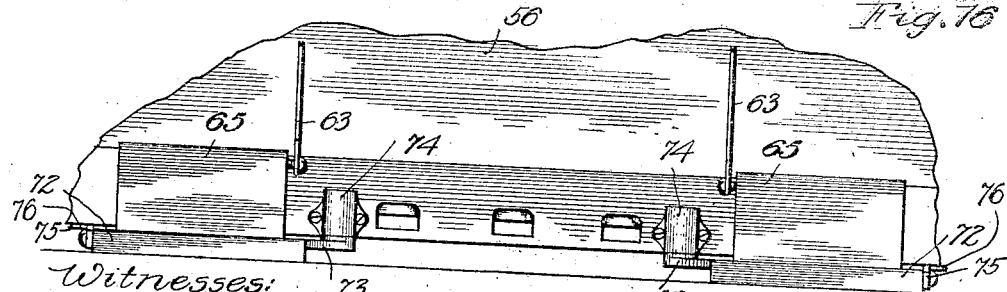

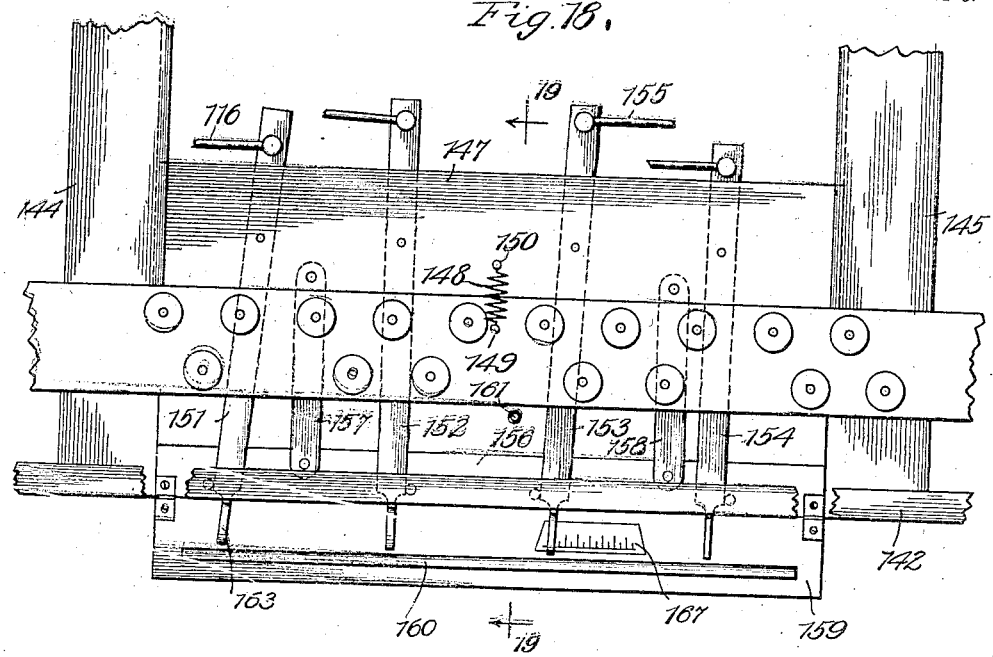
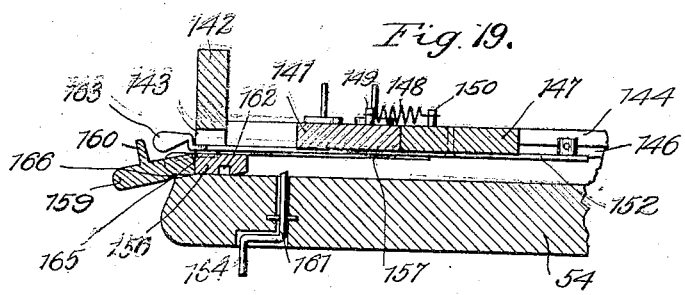
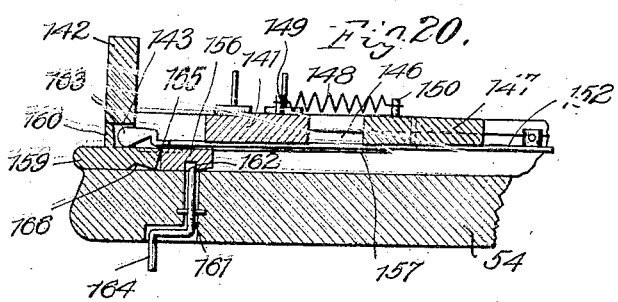

UNITED STATES PATENT OFFICE.

LAMARTINE M. FRENCH AND WILLIAM M. O'BRIEN, OF CHICAGO, ILLINOIS.

AUTOMATIC-PLAYING PIANO.

No. 931,192.

Specification of Letters Patent.  Patented Aug. 17, 1909.

Application filed November 11, 1907. Serial No. 401,674.

*To all whom it may concern:*

Be it known that we, LAMARTINE M. FRENCH and WILLIAM M. O'BRIEN, citizens of the United States, residing at Chicago, in the county of Cook and State of Illinois, have invented a certain new and useful Improvement in Automatic-Playing Pianos, of which the following is a full, clear, concise, and exact description, reference being had to the accompanying drawings, forming a part of this specification.

Our invention relates to automatic playing instruments such as pianos, and contemplates improved features of arrangement, construction and operation.

The automatic playing outfits for pianos usually comprise tracker-board and music roll mechanism, a driving motor therefor, pneumatic action mechanism, feeder bellows and regulating bellows mechanisms, pedal mechanism attachments and controlling lever mechanism. Heretofore in instruments of this class these various parts have been contained within the piano casing, and it has been very difficult to arrange the various parts in such a manner that the normal operation of the piano will not be interfered with and that the piano parts are entirely free and accessible for inspection and repairs, particularly in regulating the action and tuning of the piano. In some instruments of the prior art, provision is made for removing some of the automatic playing parts to allow access to the piano parts, but with this arrangement the adjustment of the automatic parts is very apt to be disturbed as the parts are removed by a piano man, who is not always an expert so far as the automatic playing mechanism is concerned. The main purpose of our invention, therefore, is to simplify the parts, to condense and combine some of them and to arrange the majority of them outside of the piano casing.

In accordance with our invention, the pneumatic action mechanisms are the only mechanism inside of the casing and these are placed in the most out of the way place, namely, just above the rear end of the keys and in front of the abstract rods of the piano. The tracker-board and roller mechanism and the motor, which heretofore were separate structures, we combine into a single structure, the tracker-board, music rolls and the motor parts being all contained in a single frame or housing which is detachable when the automatic feature is not to be used and which is adapted to be set on the music ledge or shelf of the piano when the automatic feature is to be used, registering pneumatic connection being provided. The feed bellows mechanism is arranged below the key bed at the outside of the piano casing and is securely attached thereto. The actuating pedals are pivoted to the base of the piano, to be swung below the piano when not in use and to be swung forwardly to be connected with the feed bellows mechanism when the automatic feature is to be used. The actuating levers for these various parts are arranged above the key bed but below the keys, in an entirely out of the way place and are normally concealed, pressure on a trigger causing the levers to be thrown forwardly into a position for use. Thus all the piano parts themselves are at all times accessible, the only part of the automatic system to be removed being the housing containing the tracker-board music rolls and the motor parts, but provision is made so that this frame will be brought into perfect registration with the other parts when set in its designated position on the music ledge. There is thus no danger whatever that any of the pneumatic parts will become deranged.

In the various drawings which illustrate our invention Figure 1 is a front view of the housing containing tracker-board, music rolls and motor parts; Fig. 2 is a sectional view taken on line 2—2 of Fig. 1; Fig. 3 is a sectional view taken on line 3—3 of Fig. 1; Fig. 4 is a sectional view taken on line 4—4 of Fig. 1; Fig. 5 is a detached sectional view showing the reversing arrangement for the music rolls; Fig. 6 is a plan view of the pneumatic tube strip secured to the base of the housing shown in Fig. 1; Fig. 7 is a plan view of the part of the music ledge or shelf on which the music roll motor cabinet housing is placed and shows the pneumatic tube openings which register with the openings shown in Fig. 6; Fig. 8 is a diagrammatic perspective view of a piano casing, the playing attachment being removed; Fig. 9 is the same view as Fig. 8, showing the attachment applied; Fig. 10 shows one of the pneumatic terminals for connecting the tracker-board tubes with the pneumatic action mechanisms; Fig. 11 is an enlarged sectional view taken on line 11—11 of Fig. 2; Fig. 12 is a front view partly broken away and partly in section showing the main valve or cut-off box and the feeder and supporting tubes for the pneumatic actions; Fig. 13 is a front view partly broken away and partly in section of the valve box and controlling bellows for the motor; Fig. 14 is a sectional view taken on line 14—14 of Fig. 13; Fig. 15 is a vertical sectional view through the piano key bed, lower panels and base, showing a side view of one of the feeder bellows mechanisms and one of the actuating pedals connected therewith; Fig. 16 is a front view of the lower part of the piano showing the pedal arrangement; Fig. 17 is a plan view of a pedal; Fig. 18 is a plan view of a section of the key bed, showing the arrangement of the actuating lever mechanism and the manner of concealing said mechanism; Fig. 19 is a sectional view taken on line 19—19 of Fig. 18; Fig. 20 is a view taken on plane 19—19 of Fig. 18, but showing the lever mechanism drawn in and concealed; Fig. 21 shows more in detail the catch mechanism for locking the pedals.

The housing or cabinet for containing the tracker-board, music rolls and motor mechanism comprises the base 1, the top 2, rear wall 3 and outer side walls 4 and 5, the front of the cabinet being open. Through the base along the rear are a plurality of openings 6, of a number equal to the pneumatic actions of which there usually are as many as there are piano keys. Secured to the under side of the base is a board or plate 7, having the openings 8, which register with the openings 6. Inner side walls 9 and 10 are also provided in the cabinet, and bridging these walls at the front is the tracker-board frame 11 having passageways 12 therethrough, corresponding in number to the channels 6 and 8. Secured to the front of the tracker-board frame is the tracker-board plate 13 having the openings 14 arranged in a horizontal line, each one of said openings being connected with one of the channels 12. The channels 12 are connected with the corresponding channels 6 and 8 through tubes 15 in any well known manner, these tubes being supported on a table or shelf 16 extending forwardly from the protecting vertical wall 17 at the rear of the cabinet. Pivoted between the walls 9 and 10 below the tracker-board frame is the takeup spool 18 having at its right end the driving gear 19. In the wall 9, above the tracker-board socket, is supported a pivot frame 20, and directly opposite in the wall 10 is pivoted a driving chuck 21 and driving shaft 22. A shaft 23 having horizontal bearings in the walls 10 and 5 carries the pinion 24 adapted for separable engagement with gear 19 upon actuation of clutch and lever mechanism 25, whose detailed construction it is not necessary to disclose here. Shafts 23 and 22 are suitably connected through the chain gearing mechanism 26, and shaft 23 is connected through chain gearing mechanism 27 with a crank shaft 28 journaled in the side walls 9 and 10 at the top of the cabinet. Spools such as 29 are adapted for engagement between the pivot 20 and chuck 21, and carry the music sheet. Upon rotation of the crank shaft and by adjustment of the clutch lever 25, either the take-up roller may be driven to unwind the music sheet, or the music roller driven to rewind the music sheet. The bellows 30 for driving the crank shaft are shown as secured to the rear wall of the cabinet, and are connected with the angularly displaced cranks 31 of the crank shaft through connecting rods 32.

In the music ledge or shelf 47 of the piano there is cut a groove or slot 48 in the lower half of which is inserted a plate 49 having the channels 50 spaced to register with the channels 8 in the plate 7 secured to the cabinet and having also the hole 51 through it for registering with the hole 37 through the plate 7, which hole 37 is connected through tube 36 with the exhaust chamber of the motor. The cabinet when applied rests on the music ledge with the plate 7 filling the upper half of the slot 48, and the tracker-board and motor operating parts are in perfect register with the various passageways which are connected with the exhaust producing parts and key actuating parts of the pneumatic system. To make a more air tight connection, the top of the plate 49 and bottom of plate 7 may be faced with sheepskin. When it is not desired to use the automatic feature, the cabinet can easily be lifted from the music ledge and there is no danger of the inclosed parts becoming deranged, as they are well protected by the various walls of the cabinet. The sides of the plate 7 and of the groove 48 will in most cases offer sufficient guiding means to insure perfect registration, but additional guide pins or like means 52 may be provided, carried either by the plate 7 or base 1, for engaging in openings 53 arranged either in the plate 49 or music ledge, or both.

In Figs. 15, 16 and 17, the wind devices are shown. To the under side of the key bed 54 of the piano is secured a flat wind chest 55, extending partly outside of and within the piano casing, the lower panel 56 of the piano having opening 57 cut in its top. Secured at their rear end and along the front part of the wind chest to the under side thereof are two feeder bellows 58, only the right one being shown, both right and left bellows, however, being identical in construction and arrangement. The movable lower wall 59 of each bellows is pivoted to a lever 60 whose rear end is pivoted to an arm 61 extending downwardly from the wind chest frame. A spring 62 inserted between the lever 60 and wind chest tends to normally hold the bellows in a collapsed condition. A rod 63 is employed for connecting the front end of the lever 60 with a pivot 64 extending from the corresponding pedal 65, the rod having adjustable connection with the lever 60 in the various pivotal holes 66. A passageway 67 connects the bellows with the exhaust chamber. A port 68 through the base of the bellows is controlled by a flap valve 69, which has plenty of action space between the key bed and the bellows base. The flap valve lying thus on top in a horizontal position, causes more efficient operation of the bellows. If the flap valve were suspended or in a vertical position, it would tend to hang away from the port and there would consequently be considerable leakage and slower response of the bellows. The valve is also thoroughly protected as it is practically inclosed by the bellows base and the key bed. Upon operation of the pedals, the bellows are alternatively distended to exhaust air from the wind chest 55, as is well understood. Each pedal is pivoted at one end of a frame 70 having a pocket 71 for receiving the pedal when not in use. From its other end extends the pivot 64, which is engaged by a rod 63. A lug 73 extends from the inner rear corner of each pedal frame and is pivoted to a companion lug 74 secured to the piano base, as shown. The pedal frames rest on the floor and normally are swung on the lugs 73 and 74 underneath the piano. When the pedals are to be used, the pedal frames are swung outwardly to the position shown and the pedals connected to the rods 63. At the side of each pedal frame there is also a spring catch bar 75, which engages against the lower edge of a detent 76 secured underneath the piano when the pedal frames are being swung out to operative position. When the frames reach operative position, the catch bars spring up and their ends engage against the front of the detents so that the pedal frames are locked in their out position to hold the pedals in proper alinement. When the pedal frames are to be swung back underneath the piano the spring catch bars are depressed to carry their ends below the detents.

In Figs. 2 and 10 to 14, the arrangement of the pneumatic action mechanism is plainly shown. The action mechanisms are all arranged in the rear half of the space between the music ledge and key bed of the piano above the rear ends of the keys k and in front of the lower ends of the piano abstract rods a, with which they are adapted for direct connection. We arrange the pneumatic actions 77 in a plurality of horizontal rows, each row being supported from a common frame 78 extending horizontally across the piano. Each frame forms a low pressure compartment 79 and the frames are preferably in the form of metallic tubes of rectangular cross-section, as shown, which renders them very strong and durable. We have shown four of these tubes from which the pneumatic actions extend, and brackets 80 secured to the tubes carry at the front of their horizontal arms the plate 49, which engages in the slot 48 when the parts are assembled. The action mechanism structures are rectangular, each being built up of sections and blocks of wood. Each action structure has a valve chamber 81 connected normally through opening 82 with atmosphere and adapted for connection through port 83 with the upper diaphragm chamber 84, which is separated from the lower diaphragm chamber 85 by a diaphragm 86 which carries the valve button 87, this valve button normally closing the port 83, as shown. A channel 88 connects the valve chamber with the bellows 89 at the lower side of the structure, while channels 90 register with openings 91 through the supporting tube when the action structure is secured thereto. A channel 92 leads from the lower diaphragm chamber and registers with an opening 93 through the rear wall of the supporting tube. Wood screws 94 are inserted through the tubes from the front, and engage the action structure to hold said structure securely against the rear face of the tubes. In Fig. 10, we have shown one of the pneumatic terminals for connecting the openings and plate 49 with the channel 92, and thus with the lower diaphragm chamber. Each terminal comprises a small tube 95 adapted for insertion through one of the openings 96 in the front wall of the tube and one of the registering openings 93 to the rear wall of the tube, which registers with the channel 92. The tube 95 extends into a head 97 from which extends a stub pipe 98. Tubes 99 engage at one end with these stub pipes 98 and at their other ends have engagement with the channels 50 in the plate 49. In each tube 95 there is also a bleed or equalizing opening 100, which communicates with the interior of the low pressure chamber tube when the terminal is inserted. These terminals can be readily withdrawn. These various supporting tubes are connected with the wind chest in a manner shown later. The pressure in the diaphragm chambers 84 and 85 is normally equalized, the upper diaphragm chamber being connected with the exhaust chamber tube through passageway 90, and the lower diaphragm chamber connected therewith through passageway 92, pipe 95 and equalizing opening or bleed 100, the bellows 89 being normally connected through channel 88 and port 82 with atmosphere and consequently distended. As the music sheet travels over the tracker-board and a perforation comes in register with the tracker-board opening, there will be an impulse of atmospheric air from the corresponding connecting tubes and to the corresponding pneumatic terminal, this impulse finding its way into the lower diaphragm chamber causing the diaphragm to be thrown upwardly, whereby the valve button closes the connection of bellows 89 with the atmosphere and connects said bellows to the low pressure tube through passageway 88, valve chamber 81, port 83 and passageway 90, the bellows collapsing. There is an extension 101 at the end of the movable part of each bellows, above which is an adjustable abutment 102 supported from the corresponding abutment abstract rod a. Consequently, when a bellows becomes collapsed, its extension strikes the abutment and the abstract rod is raised to cause operation of the corresponding piano hammer. The base 104 of each bellows extends forwardly the entire width of the exhaust tubes, and the movable part of the bellows does likewise, giving therefore a greater bellows capacity and more powerful action. The equalizing or bleed opening 100 is so small that there will be practically no leakage of atmospheric air into the exhaust tube chamber. However, minute particles of paper and dust are apt to pass through the connecting tubes and lodge in the equalizing openings, tending to choke them up. The terminal pipes, however, can be readily withdrawn from the supporting tubes by pulling the heads 97, and by blowing into the end thereof these minute openings can quickly be cleaned and the proper adjustment reëstablished.

As the abstract rods are placed in a vertical plane and side by side, the action structures in the different rows must be staggered in order to bring the extensions 101 into register with the abutments 102 on the abstract rods.

The tubes 78 at their left end are connected with the main valve box, through which their connection with the wind chest is controlled. This arrangement is best shown in Fig. 12. This valve box has partitions 105 and 106 to divide it into a main chamber 107 and motor supply chamber 108 and the tube supply chamber 109. A port 110 through partition 105 is normally closed by the valve 111, while the port 112 through the partition 106 is normally open but adapted to be closed by valve 113. These valves are connected by a link 114 which may be actuated from the outside by means of a crank lever 115 pivoted in the wall of the valve box and having connection with a rod 116 connected with controlling lever mechanisms which we will describe later. The various supporting pipes 78 communicate with the chamber 109 and a pipe 117 connects chamber 108 with the pipe or tube 118 leading to the hole 51 through the music ledge 47, which hole, as before described, registers with hole 37 connected with the exhaust chamber for the motor bellows. The pipes 78 are secured at their right ends to a motor valve box 119 and one of the pipes 78 connects the chamber 109 with the motor valve box. The arrangement within this motor valve box is best shown in Figs. 13 and 14. Two vertical partitions 120 and 121 and a horizontal partition 122 between the partition 121 and the wall of the box divide the valve box into compartments 123, 124, 125 and 126. Compartment 126 connects through pipe 127 with pipe 118 leading to the motor. Compartment 123 connects through passageway 128 with the regulating bellows 129 mounted on top of the valve box. Compartments 123 and 125 are connected together through a tube 130, which passes through compartment 124, and compartment 125 is adapted for connection with compartment 126 through port 131 controlled by a slide valve 132 with which an outside actuating bar 133 is connected. Compartment 124 connects through port 134 with a channel frame 135, which connects with the lower one of the supporting tubes 78. Compartments 123 and 124 are also adapted for communication through a port 136 which is controlled by a slide valve 137 pivoted at one end to the partition 120, and at its other end connecting with a post 138 which passes through the port 128 to engage the movable part of the bellows 129, a spring 139 engaging the valve as shown and tending to hold the bellows in distended position. The chamber 107 of the main valve box is connected by tube 140 with the wind chest.

When the music is passed over the trackerboard in the forward direction, the valves in the valve box are caused to assume the position shown in Fig. 12, the motor being disconnected from direct communication with chamber 107 and the various action mechanism supporting tubes being connected with said chamber and consequently with the low pressure wind chest. The valve 132 is also moved to open port 131. The low pressure is then connected with the motor valve box through the lower supporting tube, port 134, compartment 124, port 136, compartment 123, port 128 and controlling bellows 129, and also tube 130, compartment 125, port 131, compartment 126, pipe 127, pipe 118 and pipe 36 with the motor exhaust chamber. The regulating bellows 129 serves to maintain uniform or constant speed of the motor during a certain adjustment of valve 132 controlling port 131. If the pedals are pumped harder or irregularly, the irregular suction caused on the regulating bellows will cause varying collapse thereof and a variation in the size of port opening 136 to thereby control the amount of exhaust driving the motor, this principle of control being old in the art. When it is desired to rewind the music sheet, greater speed and more power is desired for the motor. Consequently the main valve box is used to close port 112 and open port 110. Closure of valve 113 disconnects the motor from the exhaust supply by way of the supply pipe 78 from chamber 107, but the motor is directly connected with the exhaust through the opened port 110, and consequently the speed of the motor can be directly adjusted by the pumping action of the pedals.

In Figs. 18, 19, and 20, the arrangement of the controlling lever mechanism is shown. Extending across the piano over the key bed 47 is the key pivot bar 141, on which are pivoted the various keys $k$ of the piano in the manner well known in the art. In the key slip 142 is cut an entrance slot 143 and from the end of this slot guide pieces 144 and 145 extend rearwardly and over guideways 146 for the ends of lever supporting plate 147. This plate is to the rear of the key pivot bar and connected therewith by a spring 148 engaging posts 149 and 150, as shown. To the under side of the bar 147 are pivoted the adjusting levers 151, 152, 153 and 154. The rear end of lever 151 is pivoted to rod 116 connected with the controlling mechanism for the valves 111 and 113 in the main valve box. The rear end of lever 152 is connected with the controlling mechanism normally controlled by the soft pedal of the piano. Lever 153 is connected through rod 155 with the actuating plate 133 connecting with valve 132 which controls the operation of the motor and lever 154 connects with the mechanism normally operated by the loud pedal of the piano. Another strip 156 extends across the space below the bars 141 and 147 with its ends engaging the guide pieces 144 and 145. This strip 156 is connected with the bar 147 by connecting pieces 157 and 158 which engage the under side of the bar 147 and the upper side of the strip 156. Hinged to the strip 156 is a supporting shelf 159 having the upwardly extending part 160 for closing the slot 143 cut in the key slip. Fig. 20 shows the normal, inoperative position of these various parts. The strip 156 and shelf 159 are pushed in and held in position by a trigger 161 extending through and pivoted in the key shelf as shown, its end engaging in slot 162 cut in the lower face of the strip 156. The shelf member 159 is in position so that the extension 160 closes the opening 143 and so that the front part of the shelf forms a continuation of the front edge of the key bed. The bar 147 is carried a distance to the rear of the stationary key pivot bar by the connecting pieces 157 and 158 when the shelf and strip parts are pushed in, the spring 148 being distended. In this position the ends 163 of the various levers are in position over the shelf part 159 and within the extension 160. By pushing the handle 164 of the tripper sidewise, its end is disengaged from the slot 162 and strip 156 released whereupon spring 148 contracts and throws forwardly the bar 147 and consequently throws forwardly shelf and strip connected with the bar by the connecting members. The ends of the levers then project outwardly beyond the key slip, as shown in Fig. 19, so that they can be readily engaged and levers operated. The hanging edge 165 of the shelf 159 is beveled slightly, as shown, and the under side of the shelf has a channel 166. The beveled edge and the channel coöperate to allow the shelf to swing downwardly a distance when drawn out, the channel receiving the edge of the key bed. The shelf and the extension 160 form a very comfortable rest for the operator's hands. On the shelf is also secured a tempo scale 167 over which the end of lever 153 extends. When the pneumatic playing feature is not in use, the shelf is pushed back into the piano to be held in such position by the trigger and the front of the piano will present its natural, unbroken appearance. A lid or cover having substantially the shape of the plate 7 can also be provided for replacing plate 7 when the music roll cabinet is removed, the music shelf then having its natural, unbroken appearance when the cabinet is removed, this cover or lid serving also to protect the passageways through the plate 48 and the various pipes leading therefrom to the action mechanisms.

It can readily be seen that the automatic attachments which we have described are extremely simple in their construction, assembly and their relative arrangement, and also with respect to the piano casing with which they are associated. Only the supporting tubes, valve boxes and pneumatic actions are actually within the piano casing, but these parts are placed in the most out of the way corner. The valve boxes to which the pipes are secured are fastened to the sides of the piano case and the entire unitary structure comprising the valve boxes, tubes, brackets and tracker strip can be easily pulled out from the front of the piano by merely unfastening the valve boxes. Each tube with its pneumatic action mechanisms can also be independently withdrawn by disconnecting it from the valve boxes and brackets. Inspection and repairs can thus be very quickly and accurately accomplished. The compact arrangement which consists of having the motor parts, music roll and tracker-board parts all within a common housing or cabinet is also a novel and very important feature, and more so the arrangement of having this cabinet disposed at the outside of the piano and detachable. The feed bellows are usually the most bulky and cumbersome members in instruments of this kind, and it is very difficult to place them within the piano casing in a position where they will not interfere or be in the way of the piano parts. However, by placing them underneath the key bed as we do, they are in the most out of the way position and more readily inspected for repairing. These various features we think are broadly new, and we desire to secure by Letters Patent the following claims:

1. In an automatic playing piano, the combination of a plurality of metallic supporting tubes arranged horizontally in a tier and forming air chambers, a plurality of valve structures secured at their front ends to the inner faces of the tubes and extending rearwardly, an actuating bellows for each valve structure secured to the under side thereof and extending below the supporting tube, and abstract rods for the piano engaged by the action bellows.

2. In a pneumatically operated piano, the combination of a piano playing mechanism having abstract rods, a plurality of pneumatic action mechanisms within the piano casing, said pneumatic action mechanisms being arranged in horizontal rows forming a tier, an independent tubular metallic support in front of each row of pneumatic action mechanisms, the pneumatic action mechanisms being secured at their front ends to the rear faces of the supporting tubes, each action mechanism comprising an actuating bellows and controlling valve mechanism therefor, the action bellows being below the controlling valve mechanism with their hinged ends extending underneath the supporting tube, the movable member of each action bellows having direct connection with one of the abstract rods of the piano, an exhaust means, said tubular frames forming air chambers having connection with the exhaust means, and means controlling the connection of each pneumatic action mechanism with the interior of its supporting tube.

3. In an automatic playing piano, the combination of the piano playing mechanism, a plurality of pneumatic action mechanisms associated with the piano playing mechanism, a common supporting frame in the form of a tube from which said pneumatic actions extend and are supported, said tube forming a pneumatic supply chamber for the pneumatic actions, tracker-board mechanism, conductors leading from said tracker-board mechanisms to the pneumatic mechanisms, the connection of each conductor with the corresponding pneumatic action being in the form of a pipe inserted through the walls of the supporting tube and pneumatic action.

4. In an automatic playing piano, the combination of the piano playing mechanisms, a plurality of pneumatic action mechanisms associated with the piano playing mechanism, a common supporting frame for the pneumatic actions forming a pneumatic supply chamber for the pneumatic actions, tracker-board mechanism, conductors leading from said tracker-board mechanism, a pipe at the end of each conductor, openings through the walls of the supporting frame, said pipe being adapted to pass through said openings into engagement with the pneumatic action mechanisms and a bleed opening in said pipe communicating with the pneumatic supply chamber when the pipe is inserted in said openings.

5. In an automatic playing piano, the combination of a supporting frame forming a low pressure chamber, an action bellows extending from said frame, valve mechanism extending from said frame for controlling said bellows, a pipe passing through the low pressure chamber and connecting with the valve mechanism, means controlling the connection of said pipe with atmosphere, and a bleed connection between said pipe and said low pressure chamber.

6. In an automatic playing piano, the combination of a supporting frame forming a low pressure chamber, framework extending from said low pressure frame, an action bellows supported from said framework, a valve normally disconnecting said bellows from the low pressure chamber, pneumatic mechanism for controlling the action of said valve, a plug in the form of a pipe extending through the low pressure chamber and the walls thereof, and communicating with the pneumatic valve-controlling mechanism, means controlling the connection of said pipe with atmosphere, and a restricted connection between said pipe and the low pressure chamber, said plug being readily removable from said low pressure chamber frame.

7. In an automatic playing piano having abstract rods, the combination of the piano abstract rods a plurality of frames in the form of tubes forming low pressure chambers, a plurality of pneumatic action mechanisms supported in a row from each tube and adapted for connection with the abstract rods of the piano, a trackerboard for controlling the connection of the pneumatic action mechanisms with atmosphere, motor mechanism for causing travel of music sheets over the trackerboard, a source of low pressure, a valve box having valve mechanism for controlling the low pressure supply for the motor, a second valve box having valve mechanism for controlling the connection of the low pressure source with the low pressure tubes and with the first valve box, a direct passage to the motor from said second valve box, said direct passage being normally closed and the low pressure source connected with the low pressure tubes through the second valve box and with the motor through the first valve box, actuation of the valve mechanism in the second valve box causing disconnection of the low pressure tubes and the first valve box from the low pressure source and connection of said low pressure source with the motor through the direct path.

8. In an automatic playing piano having abstract rods, the combination of a plurality of tubes forming low pressure chambers, pneumatic action mechanisms supported from said tubes and having connection therewith and adapted for connection with the abstract rods, trackerboard mechanism for controlling the connection of the pneumatic action mechanisms with atmosphere, motor mechanism for driving music over the trackerboard mechanism, a source of low pressure, a valve box having valve mechanism for controlling the connection of said low pressure source with the low pressure tubes, a passage for connecting the low pressure source with the motor, regulating means in said passage, a second valve box having valve mechanism for controlling such passage, a passage leading directly to the motor, a valve in the first valve box controlling such direct passage, and means for causing actuation of the valve mechanisms in the first box to disconnect the low pressure tubes from the low pressure source and to connect said low pressure source directly with the motor through such direct passage.

9. In an automatic playing piano having abstract rods, the combination of the piano abstract rods a plurality of tubes forming low pressure chambers, pneumatic action mechanisms supported from said tubes and having connection therewith and adapted for connection with the abstract rods of the piano, trackerboard mechanism for controlling the connection of the pneumatic action mechanisms with atmosphere, motor mechanism for driving music sheets over the trackerboard mechanism, a source of low pressure, a valve box having valve mechanism for controlling the connection of said low pressure source with the low pressure tubes, a second valve box having valve mechanism for controlling the connection of said low pressure source with the motor, said low pressure tubes being supported at one end from the first valve box and at the other end from the second valve box, said valve boxes being secured to the piano frame.

10. In an automatic playing piano, the combination of the piano casing, a keyboard at the front of said casing, a shelf at the outside of said casing over the keyboard, the piano playing mechanism within the piano casing, pneumatic actuating mechanism within the piano casing associated with the piano playing mechanism, means located within the casing for supplying power to the pneumatic actuating mechanism, a portable cabinet for resting on said shelf, music roll mechanism and tracker-board mechanism within said cabinet, and means for connecting the parts within said cabinet with the pneumatic actuating mechanism within the piano casing when said cabinet is placed on said shelf, said cabinet with the contained parts constituting a complete finished and independent structure which is intended to be removed from the piano when the pneumatic playing mechanism is not desired to be used.

11. In an automatic playing piano, the combination of the piano casing, pneumatic playing mechanism within the casing, a keyboard at the front of the casing, a shelf formed by the piano casing at the outside thereof and above the keyboard, a portable cabinet set on said shelf and adapted to be lifted therefrom, controlling mechanism within said cabinet for controlling the operation of the pneumatic mechanism within the casing, connecting terminals on said shelf connected with the pneumatic mechanisms within the casing, and companion connecting terminals on said cabinet for engagement with the other terminals whereby the controlling parts within the cabinet will be automatically connected with the pneumatic mechanism within the casing when the cabinet is set on said shelf, said cabinet and parts contained therein constituting an independent and finished structure which is intended to be removed from the piano when the pneumatic playing mechanism is not to be used.

12. In an automatic playing piano, the combination of the piano casing, pneumatic playing mechanism within the casing, a horizontal supporting shelf supported by the casing, pneumatic connections from the pneumatic playing mechanism terminating in said shelf, a portable cabinet adapted to stand on said shelf over said terminals, controlling mechanism within said cabinet for controlling the operation of the pneumatic mechanism, pneumatic connections from said controlling mechanisms terminating in the base of said cabinet, said terminals of the pneumatic connections serving to pneumatically connect the controlling mechanisms with the pneumatic playing mechanism when said portable cabinet is set on said shelf, said cabinet constituting an independent complete structure intended to be applied to the piano only when the pneumatic playing mechanism is to be used.

In witness whereof, we hereunto subscribe our names this seventh day of November A. D., 1907.

LAMARTINE M. FRENCH.
WILLIAM M. O'BRIEN.

Witnesses:
LEONARD W. NOVANDER,
E. F. WAITE.